March 11, 1930.  H. C. LORD  1,749,824
METHOD OF BONDING RUBBER AND ARTICLES PRODUCED THEREBY
Filed April 5, 1923
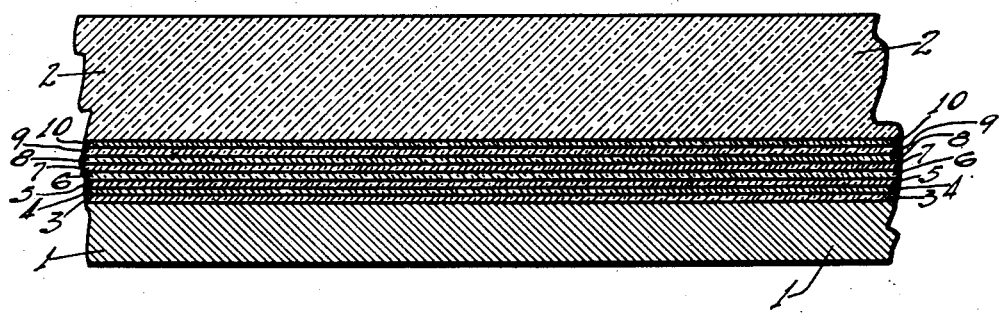
Inventor
Hugh C. Lord Patented Mar. 11, 1930

1,749,824

UNITED STATES PATENT OFFICE

HUGH C. LORD, OF ERIE, PENNSYLVANIA

METHOD OF BONDING RUBBER AND ARTICLES PRODUCED THEREBY

Application filed April 5, 1923. Serial No. 630,178.

This invention is designed to improve the bonding of rubber, particularly the bonding of rubber to a metal base. In bonding rubber to a metal base, particularly where the rubber is subjected to stress or movement it is desirable to interpose between the rubber and the metal base cements which may be applied to the base, which cements are compounded to give them a bonding quality with the metal base as prepared. This method has been quite extensively used in bonding rubber to metal. This cement also should be comparatively stiff so that the actual point of bonding is relieved of bending stress or wear. Difficulty has been experienced in bonding different rubbers to this bonding cement so as to stand the stresses of repeated movement of the rubber. One reason for this difficulty has arisen from the fact that the shift from the comparatively stiff bonding cement to the comparatively resilient body of rubber has localized the stress immediately at the bond. Another reason is that many rubbers which may be desirable to use as the body of rubber do not have a proper affinity for the rubber used as the bonding cement and consequently there is a failure of bonding between the cement and rubber. It will be understood that with the ordinary method of bonding rubber to metal the cement is applied, dried, and the rubber applied and the whole vulcanized together.

With this invention these difficulties are largely overcome. In carrying out the method in the preferred form I first apply a layer of bonding cement to the metal base using a bonding cement which will assure the proper bonding to the metal and preferably a cement that is compartively stiff. I then apply successive layers of cement to this initial layer and preferably form these successive layers of mixtures of cements, one portion being that of the bonding cement and the other portion being a cement formed of the rubber which finally forms the body of rubber. Starting with the layer next the bonding cement, the bonding cement would have a preponderance and the successive layers should vary decreasing this preponderance and as the layers approached the body of rubber the preponderance should be with the cement of the quality of the body of rubber, the final layer being preferably a cement made wholly of the quality of rubber used in the body. In this way the variation in the quality of rubber from the initial layer of bonding rubber to the final body of rubber is so slight in each subsequent layer that a perfect bonding between the different layers is assured. It will be understood also that inasmuch as these layers of cement are placed one upon the other in an unvulcanized state that there is a certain amount of merging one layer with another so that in the finished product there is a gradual variation from the bonding cement to the rubber rather than distinct layers. The result, therefore, is that there is a tapering off from the comparatively stiff bonding cement to the comparatively resilient body of rubber and consequently when the body of rubber is stressed the bending action is not localized as where it is attempted to make a direct bond between the body of rubber and the bonding cement but is eased off from the comparatively stiff rubber to the comparatively resilient rubber. The method further makes possible the bonding of wide variations of rubber so that the proper quality of bonding rubber may be used for the bond and the desired or proper quality for the body of rubber may be used with the assurance of a permanent union between these. The method is also desirable in its preferred form in that it makes a very convenient means of making these variations as it is only necessary to make the two qualities of rubber compound.

The article formed by the method is shown in the accompanying drawing as follows:

1 marks the metal base, 2 the body of resilient rubber, and 3 a layer of bonding cement. This may be applied with a brush or by dipping and in some instances this layer may be formed by more than one dipping. Following the layer 3 of bonding cement are layers 4, 5, 6, 7, 8 and 9 of mixed cements and preferably a layer 10 of cement wholly of the rubber forming the body 2. It will be noted that there are six intermediate layers, 4 to 9 inclusive. Ordinarily these will be stepped up in variations of one-sixth with each layer. Thus the layer 4 will be made up of five parts of the bonding cement and one part of cement made of the body rubber 2, and the layer 5 with four parts of bonding cement and two parts of the cement made of the body rubber 2, thus varying one-sixth with each layer so that the rubbers coming in contact and bonding in the vulcanization are very nearly of the same quality and thus have a bonding affinity.

In applying the different layers of cement I prefer to apply one layer to the other as fast as the layers set sufficiently to hold their shape and then let the whole mass of layers thoroughly dry. In this way there is a more complete merging of the layers one with the other and the use of the method in manufacturing simplified.

As an example of the resilient rubber 2 a rubber stock composed of

|  | Parts |
|---|---|
| Raw rubber | 100 |
| Zinc oxide | 3 |
| Sulphur | 5 |
| Hexamethylenetetramine | 1 | and as an example of bonding cement

|  | Parts |
|---|---|
| Raw rubber | 30 |
| Zinc oxide | 50 |
| Iron oxide | 15 |
| Sulphur | 5 |
| Lime | 1¼ |

What I claim as new is:—

1. The method of bonding rubbers which consists in interposing between two layers of rubber of different qualities a plurality of layers made up of mixtures of the two different qualities of rubber and with a preponderance of each equality of rubber in the layers nearest that quality.

2. The method of bonding rubber to metals which consists in providing a layer of bonding rubber on the metal, providing a body of resilient rubber, and interposing between the bonding rubber and the resilient rubber a layer of rubber made up of a mixture of the bonding rubber and resilient rubber.

3. The method of bonding rubber to metals which consists in providing a layer of bonding rubber on the metal, providing a body of resilient rubber, and interposing between the bonding rubber and the resilient rubber a plurality of layers of rubber made up of varying mixtures of the bonding rubber and resilient rubber, the preponderance of the rubber in the mixture being of that quality nearest which the layer is placed.

4. The method of bonding rubber to metal which consists in applying a cement to the metal, providing a layer of resilient rubber, and interposing between the resilient rubber and the cement a layer of cement made up of a mixture of the resilient rubber and the bonding cement.

5. The method of bonding metal to rubber which consists in applying a cement to the metal, providing a layer of resilient rubber, and interposing between the resilient rubber and the cement a layer of cement made up of a mixture of the resilient rubber and the bonding cement, the layer of cement having qualities intermediate that of the bonding cement and the resilient rubber.

6. The method of bonding rubber to metals which consists in providing a layer of bonding rubber on the metal, providing a body of resilient rubber, and interposing between the bonding rubber and the resilient rubber a plurality of layers of cement made up of a mixture of the bonding cement and the resilient rubber varying with the preponderance of each rubber in the layers nearest that rubber.

7. The method of bonding rubber which consists in interposing between two different qualities of rubber a plurality of layers of cement made up of mixtures of the rubbers and with the preponderance of each rubber in the layers nearest that rubber.

8. The method of bonding rubber which consists in interposing between two different qualities of rubber a plurality of layers of cement made up of mixtures of the rubbers and with the preponderance of each rubber in the layers nearest that rubber, one layer of cement being applied to another previous to the drying of the preceding layer.

9. As an article of manufacture a metal base; a resilient rubber body; a bonding rubber on the metal base; and intermediate layers of rubber between the bonding rubber and the resilient rubber made of a mixture of the bonding rubber and the resilient rubber varying from the bonding rubber to the resilient rubber.

In testimony whereof I have hereunto set my hand.

HUGH C. LORD.